(12) United States Patent
Bray

(10) Patent No.: US 6,618,392 B1
(45) Date of Patent: Sep. 9, 2003

(54) NETWORK TRANSCEIVER USING SIGNAL DETECT INPUT TO CONTROL MODES OF OPERATION

(75) Inventor: Michael Richard Bray, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/289,952

(22) Filed: Apr. 13, 1999

Related U.S. Application Data
(60) Provisional application No. 60/082,183, filed on Apr. 17, 1998.

(51) Int. Cl.[7] .............................................. H04L 12/413
(52) U.S. Cl. ....................................... 370/465; 370/463
(58) Field of Search ................................ 370/465, 463, 370/248, 352, 358, 445; 712/43; 375/211

(56) References Cited

U.S. PATENT DOCUMENTS

| | | | | |
|---|---|---|---|---|
| 5,737,316 A | * | 4/1998 | Lee ............................. | 370/248 |
| 5,754,540 A | * | 5/1998 | Liu et al. ..................... | 370/463 |
| 5,991,303 A | * | 11/1999 | Mills ........................... | 370/463 |
| 6,154,464 A | * | 11/2000 | Feuerstraeter et al. ...... | 370/463 |
| 6,393,548 B1 | * | 5/2002 | Kerstein et al. .............. | 712/43 |
| 6,430,695 B1 | * | 8/2002 | Bray et al. ................... | 375/211 |

OTHER PUBLICATIONS

"IEEE Standards for Local and Metropolitan Area Networks: Supplement to Carrier Sense to Multiple Access with Collision Detection (CSMA/CD) Access Method and Physical Layer Specifications; . . . " Section 21, IEEE 1995.*

"IEEE Standards for Local and Metropolitan Area Networks: Supplement to Carrier Sense Multiple Access with Collision Detection (CSMA/CD) Access Method and Physical Layer Specifications; . . . " Section 22, IEEE 1995.*

"IEEE Standards for Local and Metropolitan Area Networks: Supplement to Carrier Sense Multiple Access with Collision Detection (CSMA/CD) Access Method and Physical Layer Specifications; . . . " Sections 21 & 22, IEEE 1995.*

* cited by examiner

*Primary Examiner*—Salvatore Cangialosi

(57) ABSTRACT

A novel method of operating a physical layer device in a local area network, such as one conforming to Ethernet protocol, to make a single physical layer device compatible with Physical Media Dependent (PMD) devices operating over different network media types. The methodology involves monitoring signal detect inputs and based on their levels, automatically reconfiguring the physical layer device to support interface to a required PMD device. In a preferred embodiment, a physical layer device in a network transceiver for interconnecting a hub device and PMD devices has first transmitting and receiving paths for supporting interface to a first PMD device, such as 100 BASE-TX, and second transmitting and receiving paths for supporting interface to a second PMD device, such as 100 BASE-FX.

18 Claims, 6 Drawing Sheets

NETWORK TRANSCEIVER USING SIGNAL DETECT INPUT TO CONTROL MODES OF OPERATION

This application claims priority from provisional patent application serial No. 60/082,183 filed on Apr. 17, 1998, and entitled "Quad Fast Ethernet Transceiver for 10 BASE-T/100 BASE-X (QFEX 10/100)", the entire disclosure of which is incorporated by reference herein.

TECHNICAL FIELD

The present invention relates to network interfacing and, more particularly, to a novel network transceiver that uses signal detect input (SDI) pins for controlling modes of operations.

BACKGROUND ART

A Local Area Network, or (LAN), is a communications systems that provides a connection among a number of independent computing stations within a small area, such as a single building or group of adjacent buildings. One type of network structure uses one or more repeaters in a star typology, with each repeater having several ports. A data packet received at one port is retransmitted to all other ports of the repeater. Each repeater, in turn, restores timing and amplitude degradation of data packets received at one port and retransmits the packets to all other ports.

Traditional Ethernet networks (10BASE-T) operate at 10 Mb/s Ethernet protocol, as described by IEEE Standard 802.3; the majority of Ethernet interfaces currently operate at this data rate. However, a newer Ethernet network, under IEEE standard 802.3 u, accomplishes the faster operation of 100 BASE-T systems, at 125 Mb/s using unshielded twisted pair (UTP) physical media. The 100 BASE-T standard defines operation over two pairs of category 5 UTP cable for a 100 BASE-TX device. The 100 BASE-FX device, covered by the 100 BASE-T standard, allows operation over dual fiber optic cabling.

Ethernet protocol provides for a Media Access Control (MAC), enabling network interface devices at each network node to share accesses to the network medium. A Media Independent Interface, or MII, connects the MAC to a physical layer (PHY) transceiver configured for a particular network medium, e.g., 10 BASE-T, 100 BASE-FX, or 100 BASE-TX. The physical layer transceiver is configured for converting the MII protocol signals output by the MAC into analog network signals, such as Multiple Layer Transition-3 (MLT-3) signals for 100 Mb/s Ethernet networks or Manchester-encoded signals for 10 Mb/s Ethernet networks.

As Ethernet Physical Medium Dependent (PMD) devices operating over different media types use different signaling schemes, a separate network transceiver should be provided to support operations over each network media type. However, it would be desirable to provide a transceiver compatible with various types of PMD devices such as 10 BASE-T, 100 BASE-TX and 100 BASE-FX.

DISCLOSURE OF THE INVENTION

The invention provides a novel method of operating a physical layer device in a local area network, such as one conforming to Ethernet protocol, to make a single physical layer device compatible with PMD devices operating over different network media types. The methodology involves monitoring signal detect input pins and based on their levels, automatically reconfiguring the physical layer device to support interface to a required PMD device.

Typically, two signal detect inputs (SDI) are arranged for receiving an SDI signal indicating whether data received from the PMD device is valid. For example, the SDI signal may be at Positive Emitter-Coupled Logic (PECL) levels. The SDI signal that exceeds a required threshold level indicates that the received data is valid. An SDI control circuit automatically configures the physical layer device so as to support the interface to the required PMD device.

Preferably, the physical layer device comprises first transmitting and receiving paths for supporting interface to a first PMD device operable with data signals in a first format and second transmitting and receiving paths for supporting interface to a second PMD device operable with data signals in a second format. For example, Multi-Layer Transition (MLT-3) transmitting and receiving paths may be provided to support interface to 100 BASE-TX PMD device, and PECL transmitting and receiving paths may be arranged to support 100 BASE-FX PMD devices.

In response to a first logic value at the SDI, the SDI control circuit switches the physical layer device into a first mode of operation, in which the first transmitting and receiving paths provide data exchange with the first PMD device.

In response to a second logic value at the SDI, the SDI control circuit switches the physical layer device into a second mode of operation, in which the second transmitting and receiving paths provide data exchange with the second PMD device. Also, the SDI control circuit may place the physical layer device into a diagnostic loopback mode in response to a third logic value at the SDI.

Various objects and features of the present invention will become more readily apparent of those skilled in the art from which the following description of a specific embodiment thereof, especially when taken in conjunction with the accompanying drawings.

BEST MODE FOR CARRYING OUT THE INVENTION

Figure 1:
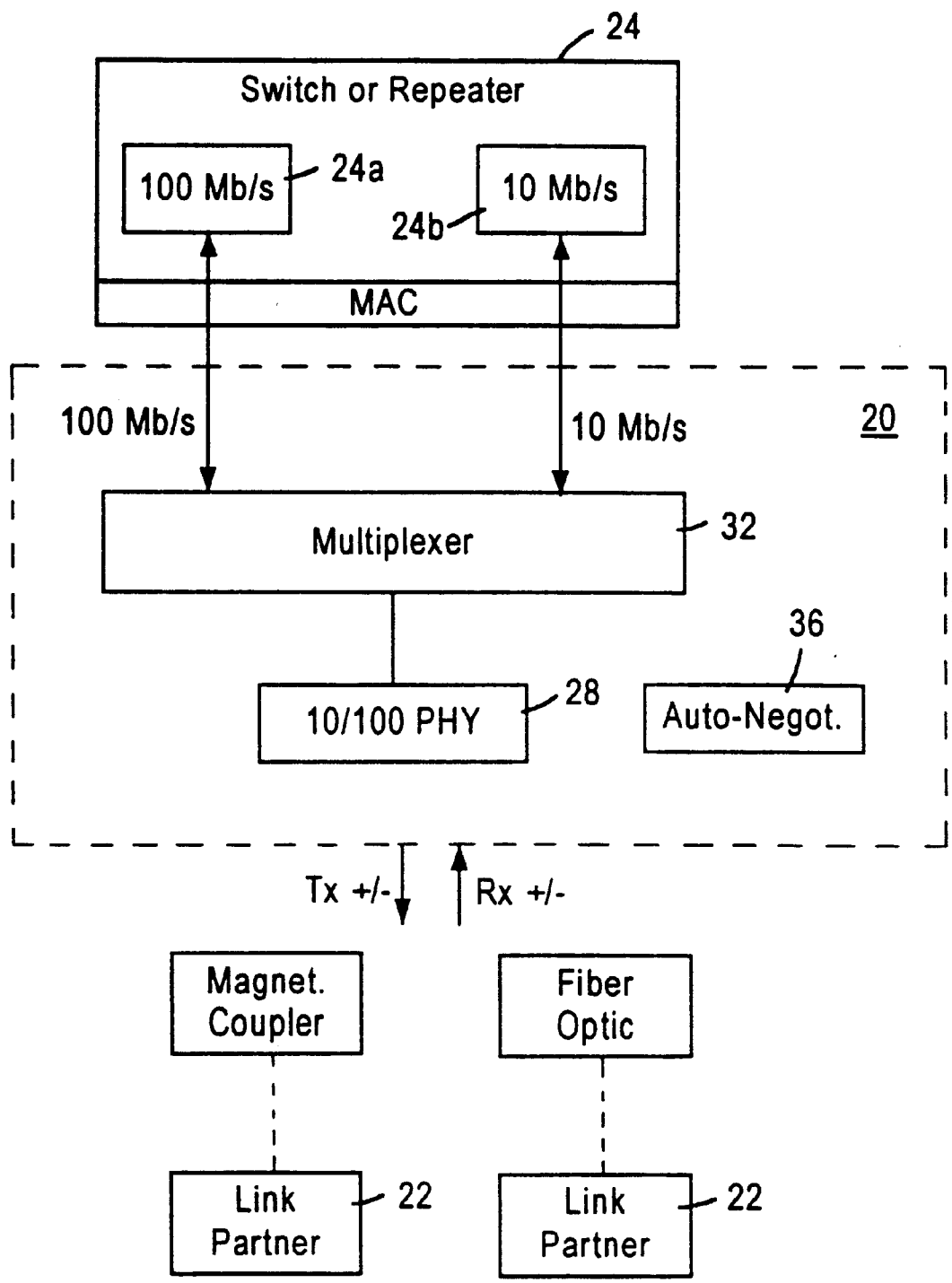
FIG. 1 is a diagram of a system, in which the present invention may be implemented.

FIG. 1 shows a transceiver 20, in which the present invention may be implemented. The transceiver 20 establishes a communication path between a link partner 22 on a network medium and repeaters 24 that are data rate compatible with the operating speed of the link partner. For example, a 100 Mb/s repeater 24a and a 10 Mb/s repeater 24b may be employed. The repeaters may be members of a system of repeaters provided in an application-specific integrated circuit (ASIC) at a HUB within which the repeaters will distribute a data stream received from the network to the various nodes. The repeaters are coupled to the transceiver via a MII interface.

The transceiver comprises a physical layer (PHY) device 28 having a data rate corresponding to the speed of operation of a link partner 22 on the network medium. A multiplexer 32 is controlled by an auto-negotiation unit 36 to route the output of the PHY device 28, through the media independent interface (MII), to whichever one of the repeaters 24a, 24b that is data rate compatible with the link partner 22. The operating speed of link partner 22 on the network medium is determined by the auto-negotiation unit 36 that establishes the speed at which to operate PHY device 28 according to IEEE 802.3 u protocol.

In the described embodiment, the PHY device 28 is configured either for 10 Mb/s data processing, or for 100 Mb/s data processing. Auto-negotiation unit 36 selects the output path of multiplexer 32 and also determines which processing speed, 100 Mb/s or 10 Mb/s, the PHY device implements. In a 10 BASE-T and 100 BASE-TX modes of operation, a magnetic coupler connects the PHY device 28 to a UTP. In a 100 BASE-FX mode, the PHY device 28 is connected to an external fiber optic transceiver that supports operations over fiber optic cabling.

Figure 2:
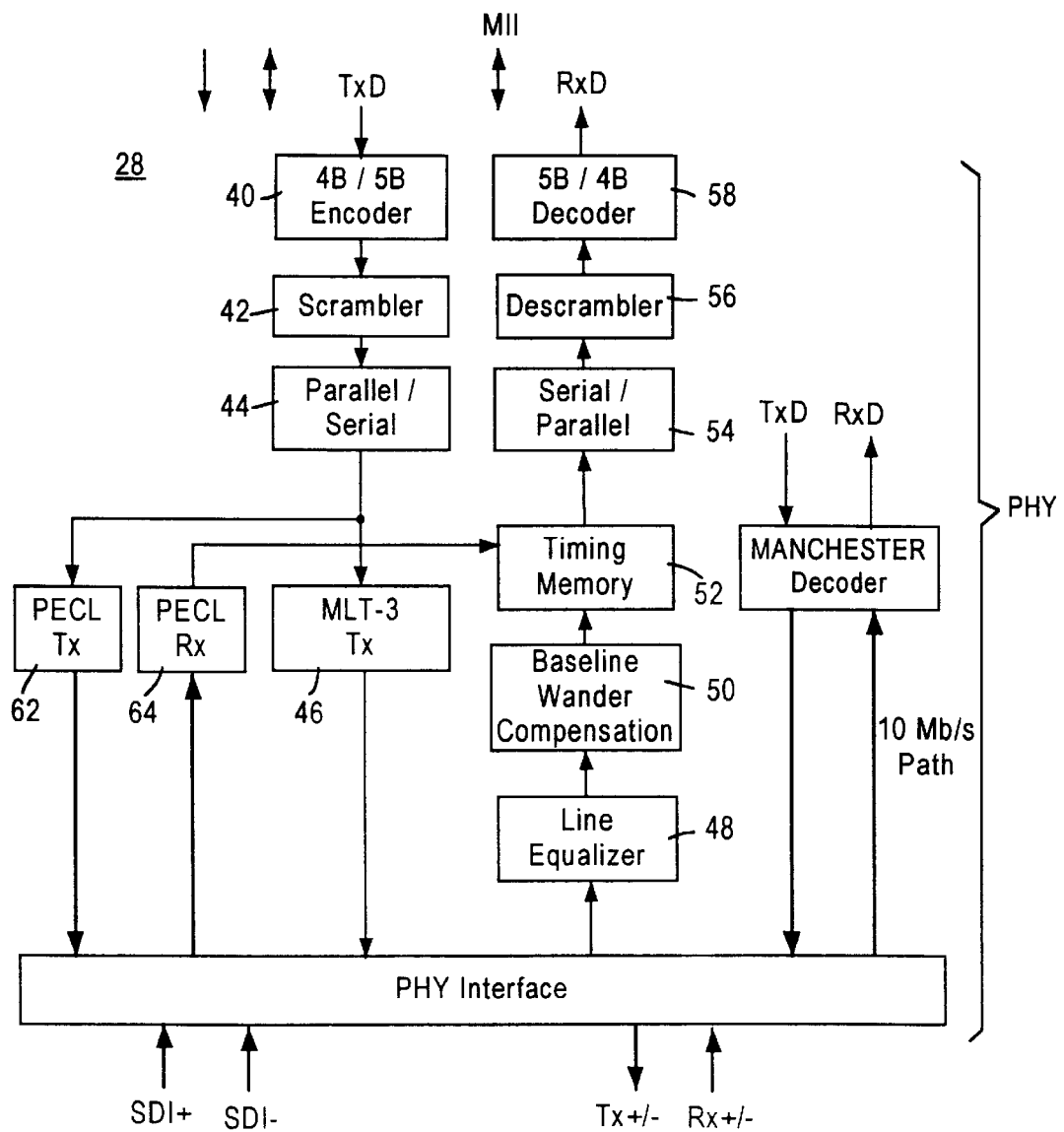
FIG. 2 is a diagram showing details of a PHY device used in implementing the invention.

Referring to FIG. 2, each PHY device includes circuitry for converting between digital data at the input to the MAC and analog data at the network medium. The PHY device 28, in accordance with the invention, establishes multiple data paths of respectively different data transmission rates. In the preferred embodiment, although two data flow paths between the PHY device and the MAC layers of the repeaters are established by way of example, one at 100 Mb/s and a second at 10 Mb/s, the invention is not limited to any particular number of paths or specific data transmission rates.

The 10 Mb/s path is provided by conventional 10 Mb/s transceiver circuitry. The second channel, 100 Mb/s, requires more signal processing to accommodate the inaccuracies and noise characteristic inherent in higher frequency rate transmission. The interface to the MAC includes clock and data management lines MDC (Management Data Clock) and MDIO (Management Data Input/Output) that are conventional in MII protocol.

In the 100 Mb/s channel of the PHY device, MAC data is exchanged according to IEEE 802.3 u protocol, with transmit MAC data TxD moving from the MAC to the network medium, and receive data RxD moving from the network medium to the MAC. The transmit data TxD in 4-bit nibbles, together with control signals, is received from the MAC and encoded by logic circuitry that includes a 4B/5B encoder 40 for adding a bit to each nibble of data. The output of encoder 40 in turn is applied to a scrambler 42 that rearranges the order of bits, in a conventional manner, so as to improve the electromagnetic interference (EMI) performance of the device. The scrambled data, in parallel bit format, is converted into a serial bit stream in parallel/serial converter 44, in the form of a shift register.

Figure 3:
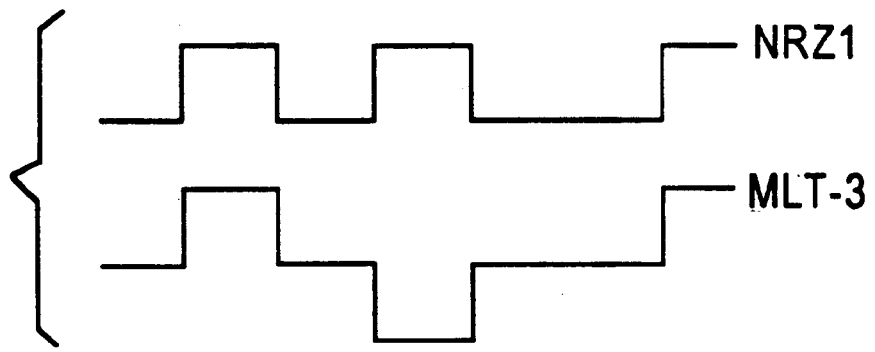
FIG. 3 shows NRZI and MLT-3 waveforms bearing a common bit sequence.

For a 100 BASE-TX link partner, output data TX+/– transmitted to the network medium should be in a Multi-Layer Transition (MLT-3) data format. Therefore, in a 100 BASE TX mode of operation, the output of the converter 44, which is a 125 MB/s serial transmission (operating at five times the rate of the 25 MB/s parallel data is received), is transformed by an MLT-3 encoder 46 from NRZI data to MLT-3 data. FIG. 3 shows the original NRZI-encoded digital signal, and a corresponding tri-level MLT-3 encoded analog signal. NRZI is a bi-level signal, in which a transition indicates a logical one value and a lack of transition indicates a logical 0 value. MLT-3 is a tri-level signal, in which all transitions are between 0 and +1 volt or 0 and –1 volt, and where successive transitions are opposite in plurality, as shown in the Figure. The purpose of MLT-3 encoding is to convert the NRZI bi-level digital signal into a tri-level signal more closely resembling a sinusoid having no DC component, and having energy of reduced intensity.

In a 100 BASE-TX mode, the receive channel passes to the MII a sequence of data nibbles obtained from the code groups incoming from the network. The incoming signal RX+/– first is monitored to determine whether the signal qualifies as a signal to be accepted by the receiver on the basis of amplitude threshold and other specifications. If the incoming signal qualifies for assertion, it is preconditioned by a line equalizer 48 that compensates for twisted pair input lines, the lengths of which will vary with temperature and other conditions, and attenuate and degrade the input signal by different amounts.

The signal is further processed for removal of signal jitter, converted to NRZI, and then applied to a phase locked loop 52 in which channel activity is detected and clock and data components extracted. With the clock recovered, the entire backplane is in the digital domain.

The serial data stream is now converted to parallel bit format in converter 54, descrambled by descrambler 56 and reconverted to 4 bit data in decoder 58. The 100 Mb/s receive channel also performs code-group alignment and production of the necessary Ethernet protocol signals, such as carrier sense (CRS), all in accord with the receive state diagram per clause 24 of the IEEE 802.3 u specification.

For a 100 BASE-FX link partner, the output transmit data TX+/– and incoming receive data RX+/– are in a Positive Emitter-Coupled Logic (PECL) data format. Therefore, in a 100 BASE-FX mode, a transmit PECL driver 62 transforms the output of the converter 44 into a PECL format, and a receive PECL circuit 64 receives the incoming receive data RX+/– and supplies it to the timing recovery circuit 52.

Figure 4:
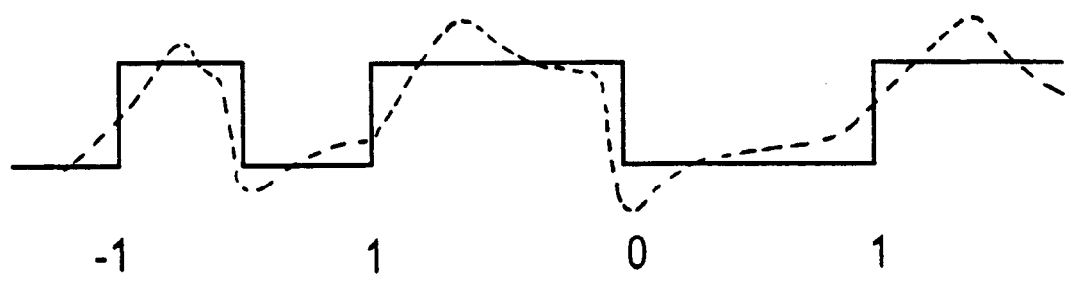
FIG. 4 shows processing of a Manchester encoded signal.

The 10 Mb/s channel receiver path requires no equalization or compensation of data incoming from the network because the rate of transmission is slower. The 10BASE-T receiver identifies the amplitude of the incoming signal and determines whether the signal is of the correct width and amplitude. If the incoming signal from the network medium is determined to be a 10 BASE-T signal, the receiver accepts and decodes it into data to be supplied to the MII. On the transmit side of the 10 Mb/s channel, pre-emphasis must be added to compensate for signal decay on the network before a signal reaches its link partner. This pre-emphasis is in the form of a waveform bulge at the leading edge of each transition, as depicted by dotted lines in FIG. 4.

Figure 5:
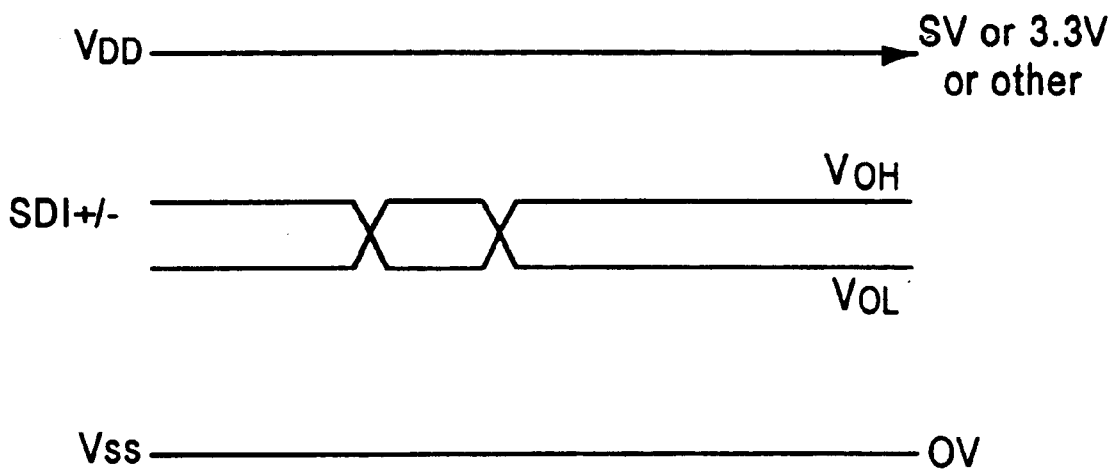
FIG. 5 shows SDI+/− waveforms.

As discussed in more detail later, signal detect inputs SDI+/– controls selection between PECL and MLT-3 data for the TX+/– outputs and the RX+/– inputs. In 100 BASE-TX and 10 BASE-T modes, the SDI+/– inputs are biased to ground or another TTL level. This enables MLT-3 or 10 BASE-T signals at the TX+/– outputs and the RX+/– inputs. TTL level 0 is between 0 V and 0.8 V. TTL level 1 is more or equal to 2.0 V. In a 100 BASE-FX mode, the SDI+/– inputs are driven at PECL levels (FIG. 5) by an external fiber optic transceiver to indicate whether the received data signal is above the required threshold.

Figure 6:
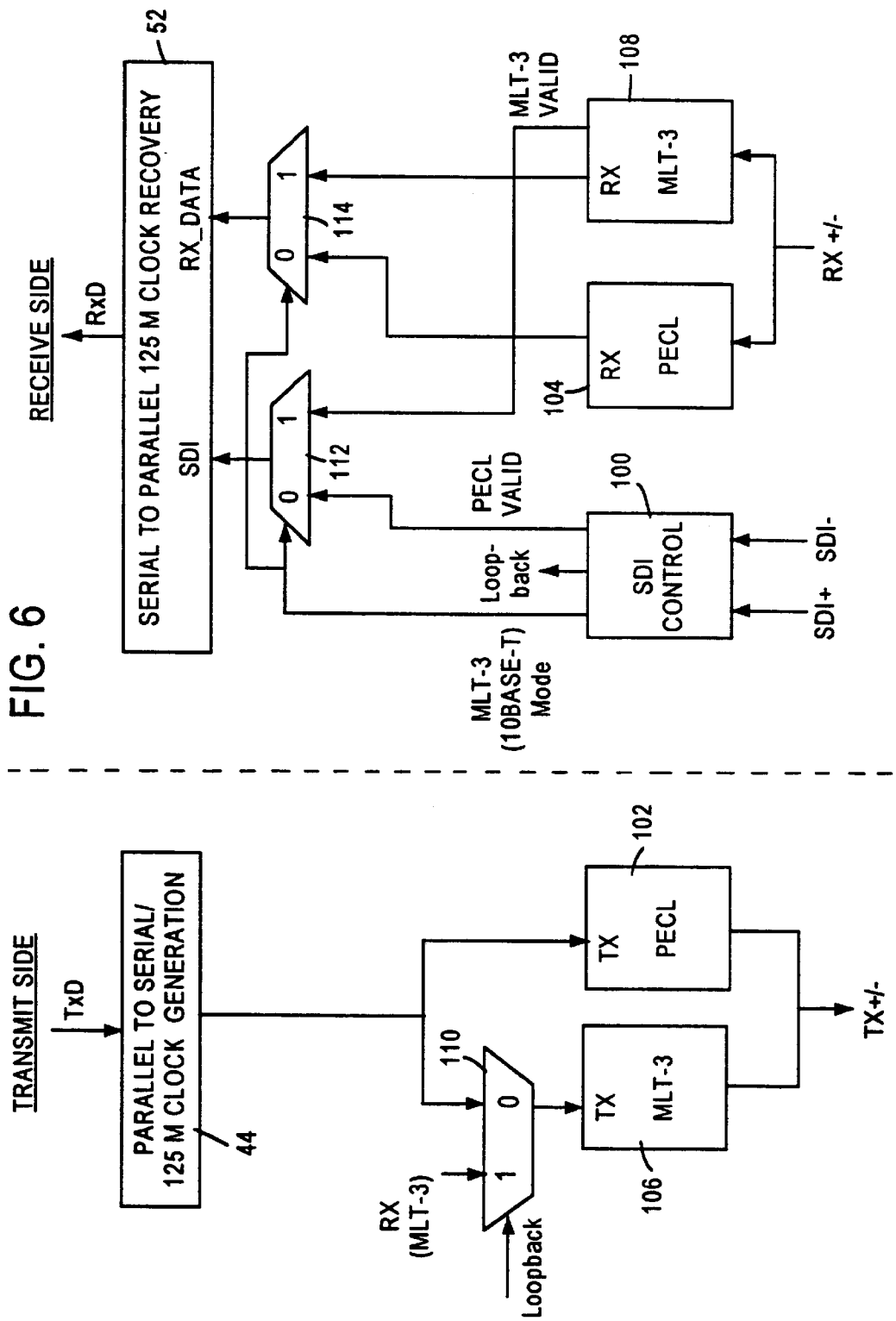
FIG. 6 illustrates a SDI control mechanism of the present invention.

FIG. 6 schematically illustrates an SDI control mechanism that comprises an SDI control circuit 100 supplied with signal detect inputs SDI+ and SDI– to generate SDI control signals for selecting transmit and receive paths in various modes of operations. A PECL transmitter block 102 and a PECL receiver block 104 respectively represent transmit and receive paths in the PMD layer for a 100 BASE-FX mode of operation. An MLT-3 transmitter block 106 represents the PMD transmit path for a 100 BASE-TX or 10 BASE-T mode. An MLT-3 receiver block 108 represents the PMD receive path for a 100 BASE-TX. As will be discussed in more detail later, multiplexers 110, 112 and 114 perform switching between various modes of operation.

In response to binary combinations representing the SDI+ and SDI− signals at TTL or PECL levels, the SDI control circuit 100 selects a mode of transceiver's operation. For example, when both the SDI+ and SDI− are at high TTL levels, the transceiver is switched to a PECL mode, in which TX+/− and RX+/− pins carry PECL data to/from a 100 BASE-FX link partner.

When both SDI+ and SDI− are at a TTL low level, the transceiver is controlled to operate in a 100 BASE-TX or 10 BASE-T mode to support MLT-3 or 10 BASE-T data on the TX+/− and RX+/− pins.

When the SDI+ is at a high TTL level and the SDI− is at a low TTL level, the transceiver is switched to a loopback mode, in which incoming receive data RX+/− is looped back to transmit pins TX+/− to perform diagnostics.

When the SDI+ and SDI− signals are at PECL levels, the transceiver operates in a 100 BASE-FX mode. In this mode, the SDI+/− signals are driven by an external fiber optic transceiver having conventional signal detect outputs to indicate whether the incoming receive signals are valid. For example, the SDI+ signal may be at a high PECL level, whereas the SDI− signal may be at a low PECL level. Alternatively, the SDI+ signal may be at a low PECL level, and the SDI− signal may be at a high PECL level. However, when both the SDI+/− signals are at the same PECL level, they are considered invalid.

Figure 7:
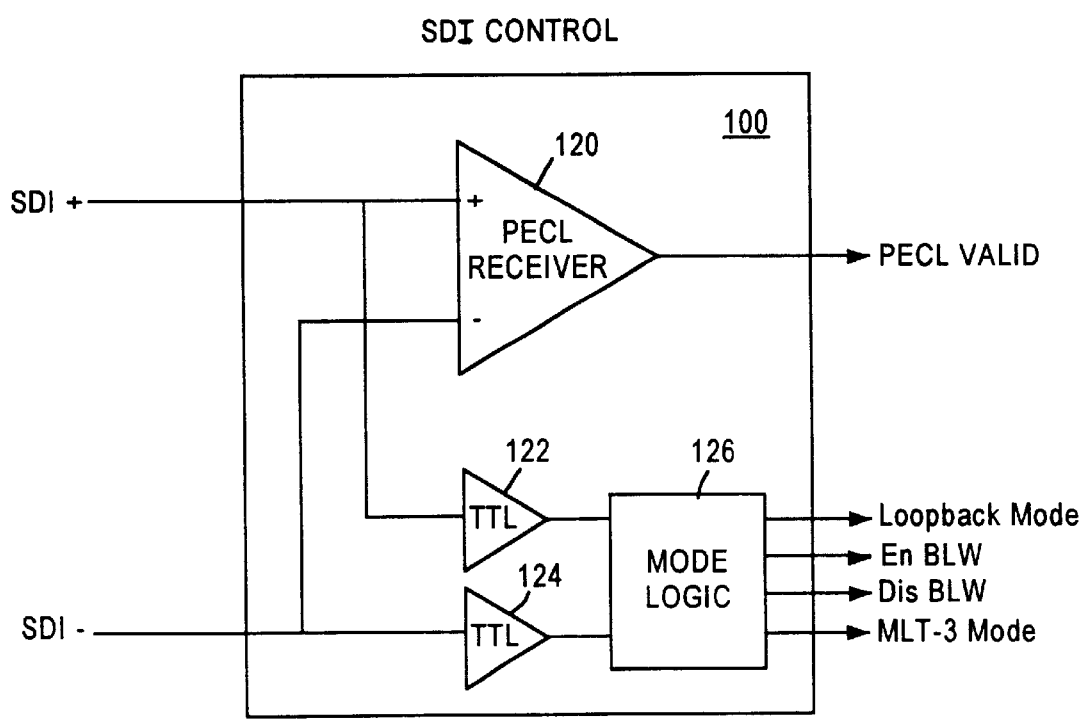
FIG. 7 schematically shows a SDI control circuit, per the invention.

As shown in FIG. 7, the SDI control circuit 100 may comprise a PECL receiver 120 to determine the logic levels of the SDI+/− signals, when they are at PECL levels. The PECL receiver 120 produces a PECL valid signal that indicates the whether the received signals are valid.

The SDI+/− signals pass via TTL gate circuits 122 and 124 to a logic circuit 126 that determines a mode of operation depending on the binary combination represented by the SDI+/− signals. If the SDI+ is at a high TTL level and the SDI− is at a low TTL level, the logic circuit 126 produces a loopback signal to switch the transceiver in a loopback mode. When both the SDI+ and SDI− are at a low TTL level, a baseline wander compensation enable signal is produced to enable the baseline wander compensation unit 50 (FIG. 2) in a 100 BASE-TX mode. If the SDI+ is at a low TTL level and the SDI− is at a high TTL level, the logic circuit 126 produces a baseline wander compensation disable signal to disable the baseline wander compensation unit 50 (FIG. 2) in a 100 BASE-TX mode.

Referring back to FIG. 6, the SDI control mechanism operates as follows. The transmit data to the MLT-3 transmitter 106 is supplied via the multiplexer 110, the second input of which receives data from the output of the MLT-3 receiver 108. The loopback signal from the SDI control circuit 100 is supplied to the control input of the multiplexer 110. When the loopback signal is not asserted, MLT-3 transmit data from the converter 44 goes to the MLT-3 transmitter 106. However, when the loopback signal is asserted, the multiplexer 110 passes the MLT-3 receive data from the output of the receiver 108 to the transmitter 106. As a result, receive data can be monitored at the transmit pins TX+/−.

A multiplexer 112 supplies the timing recovery circuit 52 with an SDI indication signal that indicates whether the incoming receive signal in a current mode of operation is valid. When the SDI indication signal indicates that the incoming receive signal is less than the threshold level, the receive signal is considered invalid. One of the inputs of the multiplexer 112 is supplied with the PECL valid signal produced by the SDI control circuit to indicate the validity of the RX+/− signal received from the external fiber optical transceiver in the 100 BASE-FX mode. The other input of the multiplexer 112 receives MLT-3 valid signal from the output of the MLT-3 receiver 108. When the SDI+ signal is as at a low TTL level, the SDI control circuit 100 provides the multiplexer 112 with an MLT-3 (10 BASE-T) mode select signal that selects a 100 BASE-TX or 10 BASE-T mode of operation (with enabled or disabled baseline wander compensation). When the MLT-3 (10 BASE-T) mode select signal is asserted, the SDI indication signal produced by the multiplexer 112 represents the MLT-3 valid signal from the output of the receiver 108. When the MLT-3 (10 BASE-T) mode select signal is not asserted, the SDI indication output of the multiplexer 112 is represented by the PECL valid signal from the SDI control circuit.

The multiplexer 114 supplies the timing recovery circuit 52 and the serial/parallel converter 54 with receive data RX. This multiplexer is controlled by the MLT-3 (10 BASE-T) mode select signal from the SDI control circuit 100 to pass either PECL data from the receiver 104 or MLT-3 data from the receiver 108 to the timing recovery circuit 52 and the serial/parallel converter 54 depending on whether the 100 BASE-FX mode or the 100 BASE-T mode is selected. Also, the MLT-3 (10 BASE-T) mode select signal controls enabling the MLT-3 (10 BASE-T) transmitter 106 and disabling the PECL transmitter 102 to support the 100 BASE-TX (10 BASE-T) mode of operation. Similarly, in the 100 BASE-FX, the MLT-3 (10 BASE-T) mode select signal enables the PECL transmitter 102 and disables the MLT-3 (10 BASE-T) transmitter 106.

Thus, in accordance with the present invention, the SDI+/− signals are used not only for indicating an SDI level in a 100 BASE-FX mode, but also for controlling selection between 100 BASE-TX (10 BASE-T) and 100 BASE-FX modes. As a result, a single transceiver is enabled to operate over UTP and fiber optic media.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative way, rather than in a restrictive sense. For example, the invention is applicable in standards other than IEEE 802.3, and logic other than TTL and PECL.

What is claimed is:

1. A network transceiver for interconnecting a hub device and Physical Medium Dependent (PMD) communication devices operating with data signals in different formats, the network transceiver comprising:

a physical layer device for providing interface to a PMD communication device, a signal detect input (SDI) for receiving an SDI signal indicating whether data received from the PMD device is valid, and an SDI control circuit responsive to a logic value at said SDI for automatically configuring said physical layer device to support interface to said PMD device.

2. The transceiver of claim 1, wherein said SDI signal is compared with a required threshold level to determine whether the data received from the PMD device is valid.

3. The transceiver of claim 1, wherein said physical layer device comprises first transmitting and receiving paths for supporting interface to a first PMD device operable with data signals in a first format, and second transmitting and receiving paths for supporting interface to a second PMD device operable with data signals in a second format.

4. The transceiver of claim 3, wherein said SDI control circuit is responsive to a first logic value at the SDI for switching said physical layer device into a first mode of operation, in which said first transmitting and receiving paths provide data exchange with the first PMD device.

5. The transceiver of claim 4, wherein said SDI control circuit is responsive to a second logic value at the SDI for switching said physical layer device into a second mode of operation, in which said second transmitting and receiving paths provide data exchange with the second PMD device.

6. The transceiver of claim 5, wherein said SDI control circuit is responsive to a third logic value at the SDI to switch the physical layer device into a loopback mode.

7. The transceiver of claim 1, wherein said SDI control logic produces a SDI indication signal for determining whether a received data signal exceeds a threshold level.

8. The transceiver of claim 7, wherein said SDI indication signal is responsive to said SDI signal when a first logic value is produced at the SDI.

9. The transceiver of claim 8, wherein said SDI indication signal is responsive to said received data when a second logic value is produced at the SDI.

10. The transceiver of claim 1, wherein the SDI is maintained at TTL levels.

11. The transceiver of claim 1, wherein the SDI signal at a PECL level is supplied from an external device.

12. The transceiver of claim 1, wherein the PMD devices are operable over different network media types.

13. The transceiver of claim 1, wherein said physical layer device conforms to IEEE Std. 802.3.

14. The transceiver of claim 13, wherein said PMD devices include 10 BASE-T, 100 BASE-TX and 100 BASE-FX devices.

15. In an Ethernet network having a physical layer device for providing direct interface to a first PMD device operable over UTP network medium and to a second PMD device operable over a fiber optic network medium, a method of operating the physical layer device comprising the steps of:

maintaining signal detect inputs (SDIs) at predetermined voltage levels, in response to a first logic combination at the SDIs, switching the physical layer device into a first mode of operation to support interface to the first PMD device, and in response to a second logic combination at the SDIs, switching the physical layer device into a second mode of operation to support interface to the second PMD device.

16. The method of claim 15, wherein the SDIs are maintained at TTL levels.

17. The method of claim 16, wherein the SDIs are arranged for receiving PECL indication signals from the second PMD device to indicate whether a data signal received from the second PMD device exceeds a required threshold level.

18. The method of claim 15, wherein in response to a third logic combination at the SDIs, the physical layer device is switched into a loopback mode for performing diagnostics.

* * * * *